Oct. 21, 1924.
J. W. MacCLATCHIE
1,512,619
CEMENTING AND CIRCULATING HEAD
Filed Sept. 5, 1922
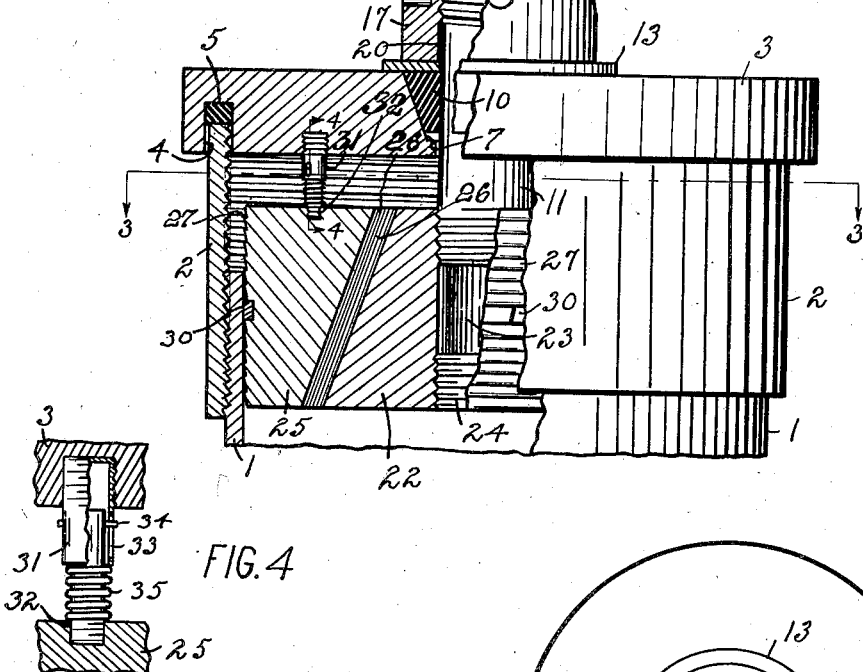
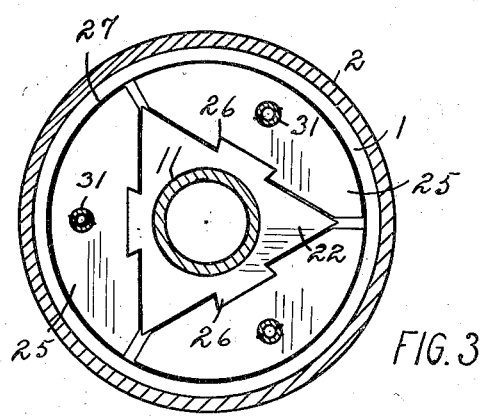
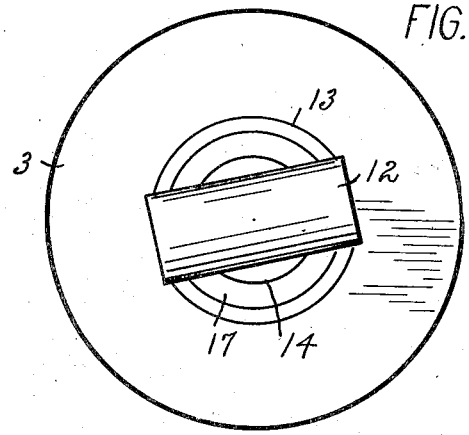
JOHN W. MacCLATCHIE
INVENTOR.
BY R. W. Smith
ATTORNEY.

Patented Oct. 21, 1924.

UNITED STATES PATENT OFFICE.

JOHN W. MacCLATCHIE, OF BREA, CALIFORNIA.

CEMENTING AND CIRCULATING HEAD.

Application filed September 5, 1922. Serial No. 586,132.

*To all whom it may concern:*

Be it known that I, JOHN W. MACCLATCHIE, a citizen of the United States, residing at Brea, county of Orange, State of California, have invented new and useful Improvements in Cementing and Circulating Heads, of which the following is a specification.

This invention relates to circulating and cementing heads adapted to be used upon oil well casing for cementing wells, washing in casing, and the like.

It is the object of the invention to provide a head including a circulating pipe adapted to extend into the casing and a closure plug or cap supporting the same and adapted to be locked in position over the end of a casing, the parts being so arranged that the head may be readily locked in position, or released from engagement with the casing by simply rotating a nut and without turning the circulating pipe. As a consequence the hose connections leading to the T head of the circulating pipe may remain coupled when the head is removed from a casing, thereby affecting a great saving of time and energy.

It is a further object of the invention to provide novel locking means which will lock the closure cap and circulating pipe relative to the casing, and which will also draw the cap down tightly upon the casing end.

The invention will be readily understood from the following description of the accompanying drawings, in which:

Fig. 1 is an elevation partly in axial section of the head mounted upon a casing end.

Fig. 2 is a top view of the head.

Figs. 3 and 4 are sections on the lines 3—3 and 4—4 of Fig. 1.

A well casing is shown at 1, and has a usual collar 2 threaded thereon, forming a standard construction which will be hereinafter referred to as the casing.

The improved head includes a cap or plug 3 adapted to be received over the end of a casing, and having an annular groove 4 in its under surface in which the collar 2 is adapted to seat, preferably with a packing ring 5 between the collar and the base of the groove.

The cap 3 has an axial bore which is recessed as shown at 7 to provide an annular tapering seat for a corresponding packing ring 10. Fluid circulating means comprising a conduit shown as the pipe 11, extends through the bore of cap 3 and the upper end of said pipe forms a usual T 12. A washer 13 is received upon the pipe 11 and rests upon cap 3 and the packing ring 10, so that when said washer is forced against the cap, it will expand the packing and thereby afford a leakproof joint between the cap and the circulating pipe.

A shoulder 14 is preferably formed at the upper end of pipe 11, and said pipe is threaded as shown at 15, with the threads terminating short of the cap 3 when the pipe 11 is in projected position as shown in Fig. 1. A nut 17 is mounted on pipe 11 above the washer 13, with the portion of the bore of said nut which is adjacent the washer and cap smooth as shown at 20, and the opposite end of the bore of the nut threaded as shown at 21 for engagement with the threads 15.

A mandrel is mounted upon the end of pipe 11 below cap 3, said mandrel comprising a frusto-pyramidal member 22 tapering toward the cap, and having a bore 23 with pipe 11 threaded into the upper end of the same. The lower end of this bore may be threaded as shown at 24 in order to engage a pipe adapted to depend into the well casing.

Slips 25 are received against the respective faces of member 22, with dove-tail connections 26 provided between the slips and said member in order to guide the slips and permit relative axial movement of member 22. The peripheral surfaces of the slips are adapted to fit within the well casing and said surfaces are toothed as shown at 27, so that when the slips are expanded and shifted upward slightly, they will firmly engage the inner surface of the casing. A spring ring 30 extends around the slips so as to contract the same against the member 22.

Yieldable connecting means are provided between the slips and cap 3, said means preferably comprising a spring construction adapted to space the slips from the cap. As an instance of this arrangement, tubes 31 may be threaded into the under surface of cap 3, with pins 32 threaded into the upper surfaces of the slips adapted to project above the same and telescope within the respective tubes. The tubes are slotted as shown at 33, and pins 32 carry cross pins 34 sliding in said slots to limit the telescopic engagement of the tubes and pins. Coil springs 35 are mounted on pins 32 between tubes 31 and the upper surfaces of the slips.

In operation the head is locked upon a well casing by screwing nut 17 down along threaded pipe 11 and thereby forcing the nut and washer 13 against cap 3. Packing 10 is thus expanded as previously described. Cap 3 being mounted upon the end of the casing, continued turning of the nut will elevate pipe 11 and the expanding member 22 which is connected thereto.

The elevation of the tapered member 22 relative to the slips will expand the latter and cause teeth 27 to engage the casing and thereby lock the head. The slips being thus fixed relative to the casing, further tightening of nut 17 will draw cap 3 down tightly upon the casing end.

To remove the head, nut 17 is loosened so that pipe 11 and the expanding member 22 may be forced downwardly through cap 3. The slips are thus released so as to contract from their locking engagement with the casing, and cap 3 is loosened upon the casing end, in order that the head may be readily withdrawn.

It will be noted that pipe 11 may be thus forced downwardly to releasing position, without threads 15 engaging packing 10 and tearing the same, since the end of threads 15 is spaced above cap 3 when the pipe is in elevated position.

It will also be noted that the locking means as thus described is operated without rotating pipe 11, thereby allowing the connections to the T head of the pipe to remain coupled when the cementing and circulating head is withdrawn, or placed in position upon a casing.

It will be apparent that various changes may be made in the construction, combination, and arrangement of parts, without departing from the spirit of the invention.

What is claimed is:

1. A casing head including a cap adapted to be received directly over the end of a casing with said cap resting upon the end of the wall of said casing, and expansible slips supported by said cap in said casing and adapted to engage said casing and draw the cap tightly against the wall thereof.

2. A casing head including a cap adapted to be received directly over the end of a casing with said cap resting upon the end of the wall of said casing, a member extending through said cap, and locking means engaging said casing for locking said member relative to said cap and drawing said cap tightly against the wall of said casing and locking said cap relative to said casing.

3. A head for well casing including closure means for a casing, means for engaging said casing, means for expanding said engaging means into operative position by axial movement of said expanding means relative to said engaging means and toward said closure means, and a yieldable connection between said engaging means and said closure means.

4. A head for well casing including a cap adapted to be received over the end of a casing, locking means for said cap adapted to engage the casing, means for expanding said locking means into operative position by axial movement of said expanding means relative to said locking means and toward said cap, and a spring connection between said locking means and said cap.

5. A head for well casing including closure means for a casing, a member slidable through said closure means, a tapering mandrel supported by said slidable member, locking means for engaging the casing adapted to be expanded into operative position by axial movement of the mandrel relative thereto, and an actuating member threaded on said slidable member and adapted to impinge against said closure means for axially moving said mandrel.

6. A head for well casing including a cap adapted to be received over the end of a casing, a conduit slidable through said cap, a mandrel supported by said conduit below said cap and tapering toward said cap, locking means for engaging the casing adapted to be expanded into operative position by axial movement of the mandrel relative thereto, an actuating member threaded on said conduit above said cap and adapted to impinge against the latter for axially moving said mandrel toward said cap, and spring means between said cap and locking means.

7. A head for well casing including closure means for a casing, engaging means between said closure means and the casing, means for expanding said engaging means into operative position, and yieldable means tending to contract said engaging means.

8. A head for well casing including a cap for the end of a casing, locking means for said cap adapted to engage the casing, means for expanding said locking means into operative position comprising a tapering mandrel adapted to be moved axially of said cap, and a dove-tail connection between said tapering mandrel and said locking means.

9. A head for well casing including a cap having an annular groove in its under face, said cap being adapted to be received directly over the end of a casing with the end of the wall of said casing received in said groove, and expansible slips supported by said cap in said casing and adapted to engage said casing and draw said cap tightly against the wall of said casing.

10. A head for well casing including a cap adapted to be received over the end of a casing, a conduit slidable through said cap, locking means for said cap supported by said conduit and operated by axial movement of the conduit, packing between said cap and conduit, and an actuating member threaded on said conduit beyond said packing and adapted to impinge against said cap and packing to expand the latter and axially move said conduit.

11. A head for well casing including a cap adapted to be received over the end of a casing, a conduit slidable through said cap, locking means for said cap supported by said conduit and operated by axial movement of the conduit, said conduit being threaded above said cap with the end of said threads spaced from said cap, and an actuating member having a bore received over said conduit, said bore being smooth at the end adjacent said cap and threaded at its opposite end for engagement with the threads upon said conduit.

12. A head for well casing including a closure cap, a conduit slidable through said cap, a mandrel having a bore adapted to receive the end of said conduit below said cap for supporting said mandrel, the bore of said mandrel being threaded at its lower end, and locking means for engaging the casing adapted to be expanded into operative position by axial movement of the mandrel relative thereto.

13. A casing head including closure means for a casing, a member slidable through said closure means, an actuating member threaded on said slidable member and impinging against said closure means for moving said slidable member through said closure means by rotation of said actuating member, and means actuated by said movement of the slidable member for engaging said casing.

14. A casing head including closure means for a casing, a member slidable through said closure means, means for moving said sliding member through said closure means, means for engaging the casing, means operated by said movement of the sliding member for expanding said engaging means into operative position, and yieldable means tending to contract said engaging means.

15. A casing head including closure means for a casing, engaging means between said closure means and the casing, means for expanding said locking means into operative position comprising a tapering member having a tongue and groove connection with said locking means.

16. A casing head including closure means for a casing, a member slidable through said closure means, packing between said closure means and sliding member, and an actuating member for moving said sliding member through said closure means and adapted to impinge against said packing to expand the latter, and means operated by said movement of the sliding member for engaging said casing.

17. A casing head including closure means for a casing, a member slidable through said closure means, means for engaging said casing supported by said slidable member and operated by axial movement thereof, said slidable member being threaded with the end of said threads spaced from said closure means, and an actuating member threaded on said slidable member and adapted for impingement against said closure means.

18. A casing head including closure means for a casing, a conduit slidable through said closure means, expanding means supported by said conduit within said casing and having means for detachably engaging a pipe, and engaging means between said closure means and said casing actuated by axial movement of said expanding means.

In testimony whereof I have signed my name to this specification.

JOHN W. MacCLATCHIE.